US012727069B2

(12) United States Patent
Domino

(10) Patent No.: US 12,727,069 B2
(45) **Date of Patent: *Sep. 1, 2026**

(54) EDGE-BASED SYSTEM ARCHITECTURE FOR BUILDING-SCALE INTERACTIVE LIGHTING

(71) Applicant: SPIREWORKS LLC, New York, NY (US)

(72) Inventor: Mark J. Domino, New York, NY (US)

(73) Assignee: SPIREWORKS LLC, New York, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 18/536,080

(22) Filed: Dec. 11, 2023

(65) Prior Publication Data

US 2024/0206041 A1 Jun. 20, 2024

Related U.S. Application Data

(63) Continuation of application No. 17/812,978, filed on Jul. 15, 2022, now Pat. No. 11,844,164.

(Continued)

(51) Int. Cl.
*H05B 47/175* (2020.01)

(52) U.S. Cl.
CPC .................................. *H05B 47/175* (2020.01)

(58) Field of Classification Search
CPC ............. H04N 21/2187; H04N 21/231; H04N 21/234363; H04N 21/23439;

(Continued)

(56) References Cited

U.S. PATENT DOCUMENTS

| | | | |
|---|---|---|---|
| 11,844,164 | B2 | 12/2023 | Domino |
| 2013/0148020 | A1 | 6/2013 | Cook |

(Continued)

FOREIGN PATENT DOCUMENTS

| | | |
|---|---|---|
| JP | 2021-022542 A | 2/2021 |
| KR | 10-2013-0142612 A | 12/2013 |

(Continued)

OTHER PUBLICATIONS

International Application No. PCT/US2022/073838 International Search Report and Written Resport Mailed Oct. 26, 2022, pp. 1-6.

(Continued)

*Primary Examiner* — Monica C King
(74) *Attorney, Agent, or Firm* — Ashurst Perkins Coie US LLP

(57) ABSTRACT

Disclosed are edge-based methods and systems for providing a user control over interactive lighting installations. An edge server may be co-located with a lighting installation, and the edge server may receive a message from a cloud layer. The message may contain user-issued commands regarding lighting behaviors that are to be performed by the lighting installation. The edge server may interpret each command, translate it into instructions that can be understood by the lighting installation, and send those instructions to the lighting installation to direct the lighting installation to execute the lighting behavior specified by the command. The edge server may utilize a buffer to organize these generated instructions and enable the instructions to be continuously streamed to the lighting installation.

20 Claims, 7 Drawing Sheets

Related U.S. Application Data

(60) Provisional application No. 63/203,356, filed on Jul. 19, 2021.

(58) Field of Classification Search
CPC ......... H04N 21/2743; H04N 21/47214; H04N 21/6125; H04N 21/64322; H04N 21/6437; H04N 21/64746; H04N 19/172; H04N 19/184; H05B 45/20; H05B 47/155; H05B 47/165; H05B 47/175; H05B 47/19
See application file for complete search history.

(56) References Cited

U.S. PATENT DOCUMENTS

| | | | |
|---|---|---|---|
| 2016/0380892 A1 | 12/2016 | Mahadevan et al. | |
| 2017/0245349 A1 | 8/2017 | Van Der Brug | |
| 2021/0037631 A1 | 2/2021 | Yu et al. | |
| 2021/0153328 A1 | 5/2021 | Seet et al. | |
| 2022/0124043 A1* | 4/2022 | Zhu | H04L 47/2475 |
| 2022/0353732 A1* | 11/2022 | Filippou | H04W 28/0289 |
| 2023/0016150 A1 | 1/2023 | Domino | |

FOREIGN PATENT DOCUMENTS

| | | |
|---|---|---|
| KR | 10-2015-0113570 A | 10/2015 |
| KR | 10-2016-0094584 A | 8/2016 |
| KR | 10-2018-0120924 A | 11/2018 |
| WO | 2021/020049 A1 | 2/2021 |
| WO | 2021/067140 A1 | 4/2021 |
| WO | 2023004284 A1 | 1/2023 |

OTHER PUBLICATIONS

U.S. Appl. No. 17/812,978, Notice of Allowance Mailed Aug. 7, 2023, pp. 1-8.
International Preliminary Report on Patentability received for PCT Patent Application No. PCT/US22/073838, mailed on Feb. 1, 2024, 5 pages.

* cited by examiner

EDGE-BASED SYSTEM ARCHITECTURE FOR BUILDING-SCALE INTERACTIVE LIGHTING

RELATED APPLICATIONS AND INCORPORATION BY REFERENCE

The present application is a continuation of U.S. patent application Ser. No. 17/812,978, filed Jul. 15, 2022 and titled "EDGE-BASED SYSTEM ARCHITECTURE FOR BUILDING-SCALE INTERACTIVE LIGHTING," which claims the benefit of U.S. Provisional Ser. No. 63/203,356, filed Jul. 19, 2021 and titled "EDGE-BASED SYSTEM ARCHITECTURE FOR BUILDING-SCALE INTERACTIVE LIGHTING." Each of the foregoing applications is hereby incorporated by reference in their entirety. Any and all applications for which a foreign or domestic priority claim is identified in the Application Data Sheet as filed with the present application are hereby incorporated by reference under 37 CFR 1.57.

FIELD OF THE DISCLOSURE

The described technology generally relates to lighting control systems and the implementation of interactive lighting that can be controlled remotely. More specifically, this disclosure relates to edge-based methods and systems, in which the lighting behavior of a lighting installation is directed by a co-located edge server based on user-issued commands received by the edge server.

BACKGROUND

Lighting control systems generally include lighting equipment and a central control system for managing the lighting equipment. The lighting equipment can be monitored, adjusted, and automated based on communications between the central control system and the lighting equipment. In residential spaces, lighting control systems are increasingly used in smart lighting solutions for providing the a particular amount of light where and when it is needed or to extend the functionality of lighting equipment. One major advantage of a lighting control system over stand-alone lighting controls or conventional manual switching is the ability to control individual lights or groups of lights from a single interface device. For instance, a simple lighting control system may provide the ability for all of a home's lighting to be controlled together (e.g., one button press can turn on six lights).

Networked lighting control systems are network-based lighting control solutions, in which the central control system (e.g., a central computing device) for managing the lighting equipment may be accessible over a network (e.g., a telecommunications or computing network). Networked lighting control systems allow operators to control the lights from their computers or handheld devices that implement the lighting system software. Through the lighting system software, operators can turn lights on and off, set timers to control the lights, schedule operation of the lights, and so forth. In some cases, advanced software programs can be used to store data and create usage charts so that energy usage can be precisely monitored.

However, existing networked lighting control systems often are intended for practical, not aesthetic, purposes and use on a limited scale. As a result, existing networked lighting control systems are generally designed and implemented to manage lights in close proximity with the system and at a single geographical location, to provide operators with control over some basic lighting behaviors (e.g., turn a light on/off), and to provide full control to a single operator at a time (selected from among a handful of privileged operators). Thus, they may not be well suited for handling problems that arise when managing lighting equipment on a much larger scale or for aesthetic purposes.

Accordingly, there exists a need for networked lighting control systems and methods that are specifically tailored for implementation on a much larger scale or for aesthetic purposes. These systems and methods would enable lighting equipment or large lighting installations, which can be at different locations, to be remotely controlled and interacted with by many operators (e.g., simultaneously) in order to perform complex lighting behaviors with precise execution. These systems and methods would allow lighting control to be effectively crowdsourced to a social network while resolving certain technical issues specifically associated with the precise execution of complex lighting behaviors on this scale. Embodiments of the present disclosure address these issues and more.

SUMMARY OF THE DISCLOSURE

Disclosed are edge-based methods and systems for enabling interactive lighting installations, such as installations, devices, etc. to be remotely controlled by a user or a social network on a large scale. In some embodiments, the lighting installations may include architectural lighting (e.g., building exterior lighting). The edge-based methods and systems involve a specific system architecture that allows for complex lighting behaviors to be planned, overridden, or precisely executed.

More specifically, in some embodiments, there may be one or more edge servers. Each edge server may be co-located with one or more lighting installations. A cloud layer may receive one or more user-issued commands regarding lighting behaviors that are to be performed by a particular lighting installation, and the cloud layer may send the commands in a message to the edge server corresponding to that lighting installation. In some embodiments, users may issue the commands to the cloud layer through a user application or lighting control software on their user device.

In some embodiments, the edge server may parse the message for any commands, interpret all or a portion of the commands to determine the associated lighting behavior, translate all or a portion of the commands into instructions that can be understood by the lighting installation, and send those instructions to the lighting installation to direct the lighting installation to execute the lighting behavior specified by the command. In some embodiments, an instruction may contain one or more discrete states or values used to instruct the lighting installation to adjust one or more lighting parameters to the indicated discrete state or value. In some embodiments, the edge server may generate multiple instructions in order to capture a command or desired lighting behavior. For example, in order to gradually change the color of a light, the edge server may generate a plurality of instructions with each instruction having a different color value for instructing the lighting installation to change the lighting color to the indicated color value. In some embodiments, the edge server may, prior to generating the instructions for performing a particular lighting behavior, calculate some or all the discrete states or values associated with performing the lighting behavior.

In some embodiments, instructions may be (e.g., continuously) streamed and sent at a repeated interval to the lighting installation. In some embodiments, the edge server may utilize a buffer to organize generated instructions in the appropriate order that they are to be sent. Instructions may be generated and added to the buffer well in advance of having to be sent to the lighting installation. For example, instructions may be generated and added to the buffer during a first time period and sent to the lighting installation at a second time period that may be minutes, hours, days, etc. after the first time period. In some embodiments, the edge server may send an instruction from the buffer to the lighting installation at a repeated interval in order to continuously stream instructions to the lighting installation.

Various aspects of the novel systems and techniques are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems and methods disclosed herein, whether implemented independently of or combined with any other aspect. For example, a system may be implemented or a method may be practiced using any number of the aspects set forth herein. In addition, the scope is intended to encompass such a system or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from an edge-based system architecture. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

In various embodiments, a computer-implemented method is contemplated to be performed by an edge server co-located with a lighting installation. The method may include the steps of receiving a message from a cloud layer, wherein the message comprises a command descriptive of a lighting behavior; interpreting the message to determine the lighting behavior described by the command; computing a plurality of lighting values based on the lighting behavior described by the command and a send rate; generating a plurality of instructions based on the lighting behavior described by the command and the send rate, wherein the plurality of instructions comprise the plurality of lighting values; inserting the plurality of instructions into a buffer; and sending, at a repeated interval based on the send rate, a first-in-line instruction in the buffer to the lighting installation.

In some embodiments, interpreting the message is based on a wire protocol adhered to by the cloud layer. In some embodiments, each instruction is a lighting control packet. In some embodiments, the send rate is forty times per second. In some embodiments, the plurality of instructions each comprises a different lighting value of the plurality of the lighting values. In some embodiments, the plurality of instructions are inserted into the buffer at a location in the buffer based on the command. In some embodiments, the command is further descriptive of an execution time for the lighting behavior. In some embodiments, computing the plurality of lighting values involves computing the plurality of lighting values in blocks. In some embodiments, the plurality of lighting values comprise lighting colors for the lighting installation. In some embodiments, the plurality of lighting values comprise color channel intensities for the lighting installation.

In various embodiments, a system is contemplated that includes a lighting installation and an edge server co-located with the lighting installation. The edge server may include a memory device that stores a set of instructions and at least one processor capable of executing the set of instructions to: receive a message from a cloud layer, wherein the message comprises a command descriptive of a lighting behavior; interpret the message to determine the lighting behavior described by the command; compute a plurality of lighting values based on the lighting behavior described by the command and a send rate; generate a plurality of instructions based on the lighting behavior described by the command and the send rate, wherein the plurality of instructions comprise the plurality of lighting values; insert the plurality of instructions into a buffer; and send, at a repeated interval based on the send rate, a first-in-line instruction in the buffer to the lighting installation.

In some embodiments, interpreting the message is based on a wire protocol adhered to by the cloud layer. In some embodiments, each instruction is a lighting control packet. In some embodiments, the plurality of instructions each comprises a different lighting value of the plurality of the lighting values. In some embodiments, the plurality of instructions are inserted into the buffer at a location in the buffer based on the command. In some embodiments, the command is further descriptive of an execution time for the lighting behavior. In some embodiments, computing the plurality of lighting values involves computing the plurality of lighting values in blocks.

In various embodiments, a non-transitory computer readable medium is contemplated that stores a set of instructions that are executable by at least one processor of an electronic device to cause the electronic device to provide instructions to a co-located lighting installation by: receiving a message from a cloud layer, wherein the message comprises a command descriptive of a lighting behavior; interpreting the message to determine the lighting behavior described by the command; computing a plurality of lighting values based on the lighting behavior described by the command and a send rate; generating a plurality of instructions based on the lighting behavior described by the command and the send rate, wherein the plurality of instructions comprise the plurality of lighting values; inserting the plurality of instructions into a buffer; and sending, at a repeated interval based on the send rate, a first-in-line instruction in the buffer to the lighting installation.

In some embodiments, interpreting the message is based on a wire protocol adhered to by the cloud layer. In some embodiments, each instruction is a lighting control packet.

BRIEF DESCRIPTION OF THE DRAWINGS

The following drawings and the associated description herein are provided to illustrate specific embodiments of the disclosure and are not intended to be limiting.

DETAILED DESCRIPTION

Figure 1A:
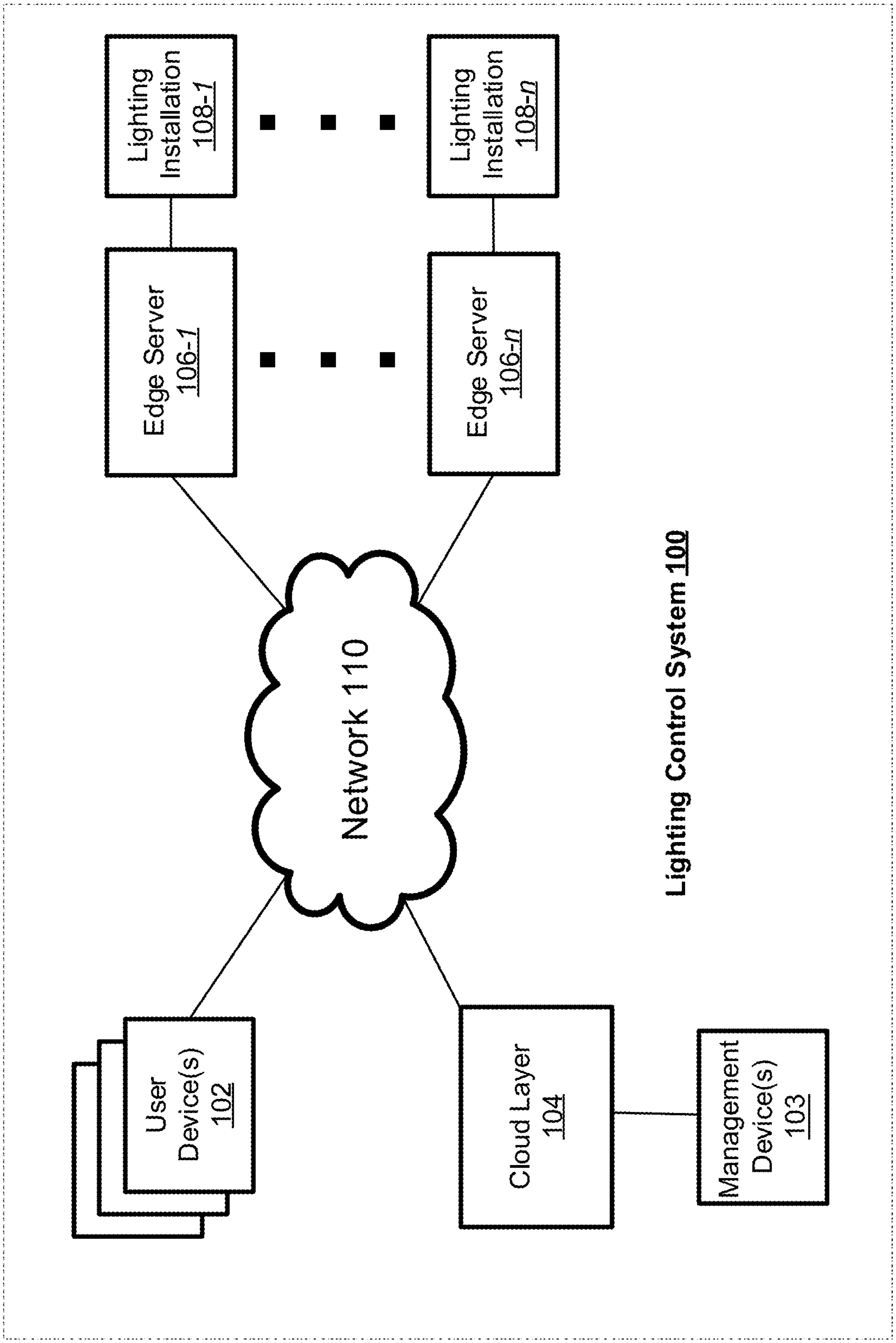
FIG. 1A is a block diagram illustrating an example lighting control system, in accordance with embodiments of the present disclosure.

Contemporary lighting control systems are generally designed for serving practical, not aesthetic, purposes and for implementation on a limited scale. For instance, they are frequently used to manage lights at a single geographical location and to provide control over basic lighting behaviors (e.g., turning on/off the lights) to a single operator at a time. However, they may not be well suited for handling problems that arise when managing lighting equipment on a larger scale, when managing lighting equipment for aesthetic purposes, and/or when enabling multiple parties to control lighting equipment (e.g., in parallel or in sequence).

This specification describes edge-based methods and systems using a networked lighting control system architecture that enables many users to remotely control and interact with different types of lighting installations for aesthetic purposes. Users may direct a lighting installation to perform a variety of complex lighting behaviors and transition between different lighting behaviors, and the edge-based methods and systems enable the precise execution of those complex lighting behaviors and seamless transitions between different lighting behaviors. This allows for lighting control of the lighting installations to be provided (e.g., crowdsourced) to an entire group of users. The lighting control of the lighting installation may be crowdsourced to an entire group as each member of the group may, at least partially, control the lighting installation. Further, each member may individually and distinctly control the lighting installation. The group of users may include a social network (e.g., a group of users connected via social relationships, interactions, etc.) of users for enjoyment and aesthetic purposes, for informational purposes, to advance social causes, etc. For example, the group of users may include a group on a social media platform (e.g., a Discord forum, a Facebook group, a group of followers on Twitter, etc.).

The overall lighting control system architecture may include user devices, a cloud layer, one or more edge servers, and one or more lighting installations. Each edge server may be co-located with one or more lighting installations. A cloud layer may receive one or more user-issued commands regarding lighting behaviors that are to be performed by a particular lighting installation, and the cloud layer may send a message containing the commands to the edge server corresponding to that lighting installation. In some embodiments, users may issue these commands to the cloud layer through a user application or lighting control software on their user device.

The edge server may receive the message and parse the message based on its understanding of the message format in order to determine any commands provided in the message. The edge server may interpret each command to determine the lighting behavior associated with each command. The edge server may translate a command into instructions of a form that can be understood by the lighting installation. The edge server may generate multiple instructions to adequately capture the desired lighting behavior associated with a command. For example, in order to gradually change the color of a light, a plurality of instructions may need to be generated with each instruction having a different color value for instructing the lighting installation to change the lighting color to the indicated color value. Thus, an instruction may contain one or more discrete states or values used to instruct the lighting installation to adjust one or more lighting parameters to the indicated discrete state or value. In some embodiments, the edge server may, prior to generating the instructions for performing a particular lighting behavior, calculate some or all of the discrete states or values associated with performing the lighting behavior.

As a general matter, the edge server may send generated instructions to the lighting installation to direct the lighting installation to execute the lighting behavior as specified by the command. However, in some embodiments, the edge server may utilize a buffer to organize generated instructions in the appropriate order that they are to be sent in, and the edge server may send an instruction from the buffer to the lighting installation at a repeated interval in order to continuously stream instructions to the lighting installation. Furthermore, instructions may be generated and added to the buffer prior to sending the instructions to the lighting installation. Therefore, the buffer can be used to schedule execution of lighting behavior at specific times or to synchronize the execution of lighting behaviors across different lighting installations.

The edge-based methods and systems described herein provides numerous technical advantages over alternative approaches, such as system architectures in which the cloud layer or the user device sends instructions directly to a lighting installation. For instance, co-located edge servers allow for a reduction in network transmissions and usage since the cloud layer sends shorter messages to the edge servers as compared to alternative approaches. Having the edge servers generate the instructions that are sent to co-located lighting installations removes the variability introduced by poor network conditions and allows for the precise scheduling and execution of complex or lengthy lighting behaviors. Furthermore, the cloud layer is able to send messages to multiple edge servers in order to synchronize execution across many lighting installations. Additionally, the edge servers can be deployed (e.g., quickly) and used to provide faster setup of lighting installations as compared to alternative approaches and integrate the lighting installations into the lighting control system. These are technical solutions for resolving many issues that specifically arise when dealing with the precise execution of complex lighting behaviors by remotely-controllable lighting installations on a large scale.

Typically, traditional systems may be unable to stream commands to lighting installations for simultaneous operation and/or operation according to a particular schedule. Further, such traditional systems may be unable to enable access to perform the operations to a plurality of different users. Instead, existing systems may provide access to perform an operation to a limited subset of users. Further, operations performed by the existing systems may be implemented in a disjointed manner (e.g., in a non-simultaneous or non-desired manner) due to network limitations. Instead, the existing systems may be unable to perform complex or lengthy lighting behaviors. Further, the existing systems may be limited to a limited subset of lighting behaviors implemented by a limited subset of devices. Therefore, the operation of the lock system by the existing systems may be limited. The use of such a traditional computing system can increase memory demands and processing usage.

Further, manual operation of a lighting installation can be inefficient and time consuming. For example, where a user is associated with multiple lighting installations, it may be inefficient and time consuming to manually operate each lighting installation. This can introduce a delay in the implementation and/or execution of lighting operations. As some actions may be time-sensitive, it may be disadvantageous to delay the implementation of operations.

The lighting control system addresses these challenges, among others, by (1) utilizing edge servers, (2) providing messages to the edge servers, (3) translating the messages at the edge server, (4) utilizing a buffer of lighting instructions, and (5) sending buffered lighting instructions to a lighting installation. This process may not be capable of being performed mentally as the human mind may not be equipped to generate lighting control packets, insert packets into a buffer, send instructions to a lighting installation, etc.

In summary, the edge-based methods and systems described herein utilize edge servers co-located with lighting installations, with the edge servers performing all or a portion of the data-intensive tasks associated with managing and controlling the lighting behavior of lighting installations. This allows for a lighting control system to be implemented on a larger scale as compared to alternative approaches, with a plurality of edge servers and lighting installations capable of receiving and executing user-issued commands provided by a central cloud layer. This approach also resolves various technical issues associated with the precise execution of complex lighting behaviors that arise when control of lighting installations is provided to multiple users (e.g., of a social network).

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse. In some cases, these forms of user input may be provided by the user through a virtual reality input device or an augmented reality input device.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), mass storage devices, and/or the like. Another example of a data store is a hosted storage environment that includes a collection of physical data storage devices that may be remotely accessible and may be rapidly provisioned as needed (commonly referred to as "cloud" storage). Additional examples of data stores may include non-transitory memory that stores data, such as dynamic random access memory (DRAM) device, a static random access memory (SRAM) device, flash memory or some other memory devices.

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Overview of Lighting Control System

FIG. 1A is a block diagram that illustrates the components of a lighting control system 100.

As shown in FIG. 1A, the lighting control system 100 may include a number of user devices 102, one or more management devices 103, a cloud layer 104, one or more edge servers 106-1 to 106-*n*, and one or more lighting installations 108-1 to **108-*n*. Although each of the edge servers 106-1 to 106-*n* is shown to be communicatively coupled one-to-one with a corresponding lighting installation 108-1 to 108-*n*, it should be understood that an edge server 106 may be coupled to one or more lighting installations 108 (e.g., one-to-many). Furthermore, each of the edge servers 106 do not need to be coupled to the same number of lighting installations 108 and the number of lighting installations 108 that each edge server 106** is coupled to may vary (e.g., one edge server may be connected to two lighting installations, another edge server may be connected to one lighting installation, and so forth).

The user devices 102, the cloud layer 104, and the edge servers 106-1 to **106-*n* may be communicatively coupled via the network 110, which can be of a conventional type, wired or wireless, and may have numerous different configurations including a star configuration, token ring configuration or other configurations. Furthermore, the network 110 may include a local area network (LAN), a wide area network (WAN) (e.g., the Internet), and/or other interconnected data paths across which multiple devices may communicate. In some implementations, the network 110 may be a peer-to-peer network. The network 110 may also be coupled to or includes portions of a telecommunications network for sending data in a variety of different communication protocols. In some implementations, the network 110** includes Bluetooth communication networks or a cellular communications network for sending and receiving data including via short messaging service (SMS), multimedia messaging service (MMS), hypertext transfer protocol (HTTP), direct data connection, WAP, email, etc.

In some embodiments, the user devices 102 and the management devices 103 may be any suitable computing device. In some embodiments, the user devices 102 and the management devices 103 may be a mobile computing device. Non-limiting examples of suitable user devices 102 and/or management devices 103 may include smart phones or mobile phones, tablet or laptop computers, desktop computer systems or personal computers, laptops, wearable computers, virtual reality devices, augmented reality devices, gaming consoles, and/or the like. In some embodiments, the user devices 102 and the management devices 103 may include a display and a processor, which can be used together to render and display graphics to a user of the device in real-time. In some embodiments, the user devices 102 and the management devices 103 may include a user input device, such as a touchscreen or keyboard or mouse, for capturing user inputs provided by a user as they interact with applications running on the user device 102 or the management devices 103. The user devices 102 may be associated with a user of the lighting control system (e.g., a user controlling lighting at a particular lighting installation) and the management devices 103 may be associated with a manager of the lighting control system.

In some embodiments, a user application may run and operate on the user devices 102 and/or the management devices 103. The user application may enable the user devices 102 and/or the management devices 103 to communicate with other components of the lighting control system 100, such as the cloud layer 104, through the network 110. In some embodiments, the user application may run on user devices 102 to allow users to send commands and interact with the lighting installations 108 using the network 110 and the other components of the lighting control system 100. In some embodiments, the user application may have a web-based user interface that the user may access via the network 110 (e.g., using a web browser).

In some embodiments, the lighting control system 100 may include one or more access points. The one or more access points may provide the user devices 102 with an interface, application, etc. to communicate with other components of the lighting control system 100 (e.g., the cloud layer 104). The one or more access points may provide access to a singular component (via the cloud layer 104) or to multiple different components. For example, a particular access point may provide a unique point of access to a particular lighting installation.

The one or more access points may include one or more software or hardware components. In some embodiments, the one or more access points may cause display of and/or include a link to a website, interface, or application, a link to download an application, image data (e.g., a quick response ("QR") code) or any other access point to an interface, application, etc.

In other embodiments, the one or more access points may include a physical component (e.g., a display). The physical component may display, provide, etc. two-dimensional image data, three-dimensional image data, audio data, etc. via a platform. For example, the one or more access points may include image data placed, illustrated, provided, etc. via a display, a sign, a plaque, an advertisement, etc. on a stand, a stanchion, an exterior or interior of a building, a floor, a ceiling, the sky, the ground, etc.

In one embodiment, the one or more access points include one or more stanchions with associated image data. For example, the stanchions may be placed outside a building (e.g., in the vicinity of the building (10 feet, 20 feet, 30 feet, etc.)) to enable access to a lighting installation associated with the building. The stanchions may include a microcontroller and/or a display (e.g., an LED display, an OLED display, etc.) and may receive image data for display from the lighting control system 100 via the network 110. The stanchions may be rechargeable to enable access to a particular lighting installation. In some embodiments, the associated image data may be a QR code. The lighting control system 100 may generate the QR code. In some embodiments, by scanning the QR code with a computing device, the user devices 102 may be provided with an interface, application, etc. to provide communications to a particular lighting installation via the cloud layer 104. In other embodiments, by scanning the QR code with a computing device, the user devices 102 may be provided with an interface, application, etc. to provide communications to multiple lighting installations via the cloud layer 104.

In some embodiments, the software component or at least a portion of the hardware component (e.g., the display) may dynamically update (e.g., periodically or aperiodically) to update displayed data. For example, the software component or the at least a portion of the hardware component may update the displayed data every hour, every six hours, every day, etc.

In some embodiments, the lighting control system 100 may dynamically update displayed information. The lighting control system 100 can determine if the displayed link to the website, interface, or application, the link to download an application, the image data (e.g., a quick response ("QR") code) is utilized (e.g., consumed) and, in response, update the displayed information. For example, a user may scan a QR code via a user computing device and access an application, interface, etc. The lighting control system 100 can determine the user accessed the application, interface, etc. In some embodiments, the lighting control system 100 can determine the user scanned or otherwise interacted with the display. Further, the lighting control system 100 may dynamically update the displayed data in response to determining the user accessed the application, interface, etc. (or scanned, interacted, etc. with the display). For example, the lighting control system 100 can dynamically update displayed data (e.g., display an updated QR code), each time an application, interface, etc. is visited based on interacting with the data in response to determining the application, interface, etc. is visited based on interacting with the data. Further, the lighting control system 100 can immediately update the displayed data in response to determining the application, interface, etc. is visited based on interacting with the data. In addition to dynamically updating the displayed data, the lighting control system can invalidate, deactivate, etc. the previously displayed data such that a user cannot use the previously displayed data to interact with the lighting installation. By dynamically updating the displayed data, the lighting control system 100 can prevent copying and subsequent use of the displayed data. Further, the lighting control system 100 can restrict the utilization of a lighting installation to users located at or nearby the lighting installation (e.g., within a particular proximity). In some embodiments, the lighting control system 100 can dynamically update the displayed data based on determining that a time period has elapsed without determining the application, interface, etc. is visited based on interacting with the data.

In some embodiments, the cloud layer 104 may operate on one or more hardware servers that are communicatively coupled to network 110 and include a processor, a memory and network communication capabilities. In some embodiments, the cloud layer 104 may operate on a system of one or more computers, one or more virtual machines executing on a system of one or more computers, as a cloud computing service (e.g., on a cluster of computing devices), and so forth. However, it should be understood that in various embodiments the described components and servers can generally be integrated together in a single component or server.

The cloud layer 104 may receive information identifying one or more lighting installations and/or edge servers from the management devices 103. For example, the management devices 103 may identify one or more lighting installations for control by a user. In some embodiments, the management devices 103 may provide a unique identifier of a lighting installation, one or more allowed operations to be performed at the lighting installation (e.g., a type of light, a duration of light, a color of light, etc.), and/or a schedule for allowed operation of the lighting installation. The management devices 103 may implement a setup process to setup the one or more lighting installations and enable control of the one or more lighting installations by a user (e.g., enable access by the user)

In some embodiments, the cloud layer 104 may receive commands from the user devices 102 (e.g., as a result of users issuing commands on the user applications running on the user devices 102). The cloud layer 104 may translate the commands into messages of a proper format, which can be sent to the corresponding edge servers 106 via the network 110. In some embodiments, all or a portion of the user-issued commands are forwarded through the cloud layer 104 and the user devices 102 may not have direct access to the edge servers 106 or lighting installations 108. Although the cloud layer 104 is in communication with the edge servers 106 (and the lighting installations 108, indirectly via the edge servers 106), individual users may have interstitial control (e.g., as defined by the management devices 103) over the lighting behavior of the lighting installations 108 (e.g., for a limited period of time). Thus, the cloud layer 104 may have a gating role where it performs the scheduling of user access and user access verification (e.g., based on data provided by the management devices 103).

In some embodiments, the edge servers 106-1 to **106-*n* may each be one or more hardware servers that are communicatively coupled to the network 110 and include a processor, a memory and network communication capabilities. The edge servers 106 may primarily serve the function of translating communications between the cloud layer 104 and the lighting installations 108. The edge servers 106 may run lighting control system software that enables the edge servers 106 to interface and communicate with the cloud layer 104 and the lighting installations 108. Each of the edge servers 106 may receive commands from the cloud layer 104 through the network 110, convert the commands to lighting instruction packets, and then send the lighting instruction packets to the appropriate lighting installation 108 that is communicatively coupled to that particular edge server 106. In some embodiments, the edge servers 106 may be co-located with the lighting installations 108 to which the edge servers 106 are communicatively coupled. In some embodiments, the edge servers 106 may collect data from the lighting installations 108 and send that data back to the cloud layer 104** for analytics.

In some embodiments, all or a portion of the lighting installations 108 may be a lighting device or a set of lighting devices for illumination, irradiation, signaling, or projection and may be capable of being controlled (e.g., smart lighting) through the use of lighting control packets. In some embodiments, lighting control packets may be used to control various aspects of the lighting installations 108 at a granular level. The controllable aspects of the lighting installations 108 may include the capability to switch individual lighting devices on/off or to set their color, intensity, and other attributes to a particular value. Examples of the lighting installations 108 may include light fixtures that are affixed to or part of a building, light fixtures located inside or outside buildings, light fixtures associated with landmarks, lights provided by drones, indoor or outdoor lamps, portable lighting devices, and/or the like. Examples of portable lighting devices include illuminated smart phone cases.

Figure 1B:
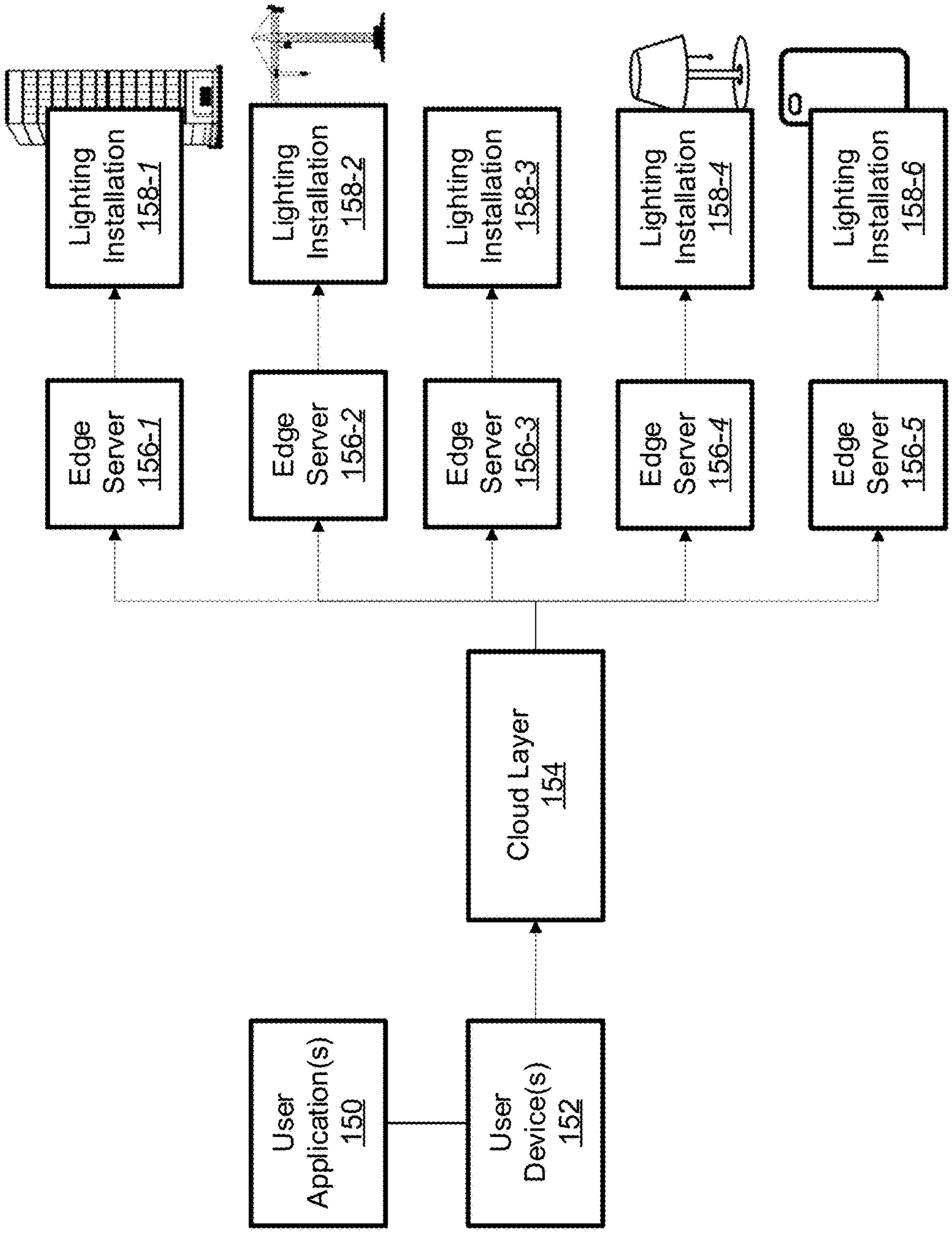
FIG. 1B is a block diagram illustrating various use cases associated with an example lighting control system, in accordance with embodiments of the present disclosure.

FIG. 1B is a block diagram that illustrates various example use cases associated with a lighting control system.

As shown, user applications 150 operating on (e.g., being implemented by) one of the user devices 152 can provide a user interface for receiving user input for controlling and interacting with a particular lighting installation. More specifically, a user application 150 may provide a user of the user device 152 with a menu of available commands that can be issued to a particular lighting installation of interest to the user. As the user makes selections within the user interface of commands to issue, the user application 150 may direct the user device 152 to send those commands to a cloud layer 154, which may provide corresponding instructions to the edge server associated with that particular lighting installation.

In some embodiments, the cloud layer 154 may convert user-issued commands into a format understood by the edge servers 156. For example, the cloud layer can convert commands into a message with a format defined in a wire protocol adhered to by the cloud layer 154 and send the messages to the appropriate edge servers 156. A user may operate the user application 150 on a user device 152 in order to control a particular lighting installation, such as lighting installation 158-1. The user may issue one or more commands through the user application 150 and the user application 150 can direct the user device 152 to send the commands to the cloud layer 154. The cloud layer 154 may translate the commands into one or more messages and send the one or more messages to the edge server 156-1 co-located with and associated with the lighting installation 158-1. In some embodiments, the cloud layer 154 may include the commands in the messages. The edge server 156-1 can receive the messages, interpret the messages to parse out the commands, generate instructions for the lighting behavior described by the commands, and send the instructions to the lighting installation 158-1 to execute.

In some embodiments, the lighting installations that can be accessed and interacted with by a particular user may be gated by the cloud layer 154 and/or the user application 150. For example, interaction with the lighting installation 158-1 may be made private and a particular user may furnish a correct code or password into the user application 150, make a payment through the user application 150, provide security credentials (e.g., on the computing device or user application 150, and so forth prior to issuing commands to the lighting installation 158-1. The cloud layer 154 may perform user access verification in order to grant a user the ability to issue commands to a particular lighting installation. In some embodiments, in order to make a determination of whether to grant a user the capability to issue commands to a lighting installation, the cloud layer 154 may consult user access policies (e.g., to check if the user is allowed to send a command to a particular lighting installation, to check if there are any special events occurring at the lighting installation, and so forth). Furthermore, the cloud layer 104 may have a gating role where it performs the scheduling of user access. For instance, a particular lighting installation may have a limit on how many users can simultaneously interact and control the lights at a time (e.g., one user at a time, five users at a time, and so forth). The cloud layer 104 may schedule users into a queue to interact with the lighting installation.

In some embodiments, a set of lights that are placed on and/or within a building may serve as a controllable lighting installation, which is represented in FIG. 1B by the lighting installation 158-1 communicatively coupled to a co-located edge server 156-1. As a specific example, the lighting installation 158-1 may be a set of lights installed at the top of a building (e.g., a skyscraper) and visible for a distance (e.g., 10, 20, 30 miles) around the building. The user application 150 may enable a user to control this lighting installation 158-1 from their user device 152 by sending commands to the cloud layer 154. The cloud layer 154 can forward the commands to the co-located edge server 156-1 associated with the lighting installation 158-1.

In some embodiments, a set of lights placed on a landmark may serve as a controllable lighting installation, which is represented in FIG. 1B by the lighting installation 158-2 communicatively coupled to a co-located edge server 156-2. In some embodiments, a user may identify the landmark with the lighting installation and check within the user application 150 to see if the lighting installation 158-2 can be controlled or is interactive. In some embodiments, the lighting installation 158-2, an access point, or a separate system may include a sign or indicator (including the configuration of the lights of the lighting installation 158-2) notifying the user that the lighting installation is compatible with the user application 150. As discussed above, an access point may be stationed in proximity to and/or associated with the lighting installation 158-2 and may provide access to and/or information associated with the lighting installation 158-2. In some embodiments, the user application 150 may have a geofencing feature that can scan for any compatible lighting installations that are within a certain proximity to the user. The user application 150 may retrieve and display the details of any resulting lighting installations. In some embodiments, the user application 150 may (e.g., automatically) notify the user if the user comes within a certain proximity to a compatible lighting installation. The user application 150 may retrieve and display the details of the particular lighting installation (e.g., in response to a prompt). In some embodiments, the user application 150 may provide information to the user identifying the significance of a particular lighting installation and any landmark associated with it. By providing the information, the user application 150 can provide users a way of interacting with the landscape around them.

As a specific example, the lighting installation 158-2 may be a set of lights installed on a tower crane in an urban area. A user walking around the urban area may walk into the vicinity of the tower crane. The user application 150 may (e.g., automatically) notify the user that the nearby lighting installation 158-2 is compatible with the user application 150. Alternatively, a sign or indicator (e.g., an access point) may be located in a particular proximity to the lighting installation 158-2 (e.g., near the crane or on the crane itself) notifying the user that the lighting installation 158-2 is compatible with the user application 150. Prior to, during, or after the user interacts with user application 150 (e.g., to control the lighting installation 158-2), the user application 150 may inform the user of the significance of the tower crane (e.g., it marks the future site of a building that will be constructed).

In some embodiments, lights mechanically coupled to one or more aerial drones (e.g., a quadcopter drone) may serve as a lighting installation, which is represented in FIG. 1B by the lighting installation 158-3 communicatively coupled to a co-located edge server 156-3. In some embodiments, the drone may be a heavy-lift ground tethered drone with lights under the drone, and the drone may fly upwards off the ground to raise the attached lights into the air (e.g., creating a spire in the air). In some embodiments, multiple drones (each with attached lights) may be used together to serve as the lighting installation. In some embodiments, the drones may be positioned (e.g., based on instructions provided by the edge sever 156-3) and/or position themselves so that the lights are in a particular spatial arrangement. In some embodiments, the spatial arrangement of the lights may be mapped out into a resource file.

In some embodiments, one or more stationary devices with lights may serve as a lighting installation, which is represented in FIG. 1B by the lighting installation 158-4 communicatively coupled to a co-located edge server 156-4. The lighting installation 158-4 may include any suitable stationary device with controllable lights (including stationary consumer devices or IoT devices), such as lamps and light fixtures, smart speakers, refrigerators and other appliances, thermostats, IoT devices, and so forth. In some embodiments, the functionality of the edge server 156-4 may be integrated into hardware and/or software components of the lighting installation 158-4 itself (e.g., made a part of the stationary device instead of being a standalone server). In some embodiments, the stationary devices of the lighting installation 158-4 may be registered with the cloud layer 154 to become part of the network of lighting installations known and accessible to the cloud layer 154, such that the lights of the devices can be controlled by the cloud layer 154 and/or the user application 150.

As a specific example, the lighting installation 158-4 may include a lamp with smart functionality (e.g., the capability of changing color in response to an input). The user can set up the lamp within their home (e.g., by a window) and register the lamp with the cloud layer 154 (via the user application 150) so that the lamp can be controlled by the cloud layer 154 and/or the user application 150. The lighting installation 158-4 may include one or more lamps. For example, the user can add additional lamps to the lighting installation 158-4 (e.g., a lamp by each window of the home) to be controlled in a synchronized manner. In some embodiments, the cloud layer 154 may issue commands to the lamp based on various causes, events, and occasions (e.g., make the light cyan for ovarian cancer night), and the user may be provided with information identifying what the specific cause, event, or occasion is within the user application 150. Therefore, by having the lamp as part of the lighting control system contemplated herein, the lamp can be integrated into a social network. The lamp can receive "content" (e.g., commands) that are associated with different kinds of cause-based or brand-based entities, in addition to being controllable by the user and/or other users on the network. In some embodiments, the network or cloud layer 154 may have primary control while users may be provided interstitial control of the lamp. Therefore, users may forego some degree of control over the lamp. By foregoing some degree of control over the lights, the lighting control system may provide various advantages as it enables multiple users to access the same lighting installation and can provide programming or content of the lights directly to the users (e.g., in response the users can determine why the light is a certain color that night).

In some embodiments, a portable device with lights may serve as a lighting installation, which is represented in FIG. 1B by the lighting installation 158-5 communicatively coupled to a co-located edge server 156-5. The lighting installation 158-5 may include any suitable portable device with controllable lights (including portable consumer devices), such as laptop cases, mobile phone cases, and so forth. In some embodiments, the portable device of the lighting installation 158-5 may be registered with the cloud layer 154 to become part of the network of lighting installations known and accessible to the cloud layer 154. Therefore, lights of the portable device can be controlled by the cloud layer 154 and/or the user application 150.

As a specific example, the lighting installation 158-5 may be a mobile phone case with lights on the back of it. In some embodiments, the functionality of the edge server 156-5 may be integrated into hardware and/or software components of the lighting installation 158-5 itself (e.g., made a part of phone case). In other embodiments, the user's mobile phone may act as the edge server 156-5. In some embodiments, the cloud layer 154 may issue commands to the phone case based on various causes, events, and occasions (e.g., make the light on the back of the case a certain color today), and the user may be provided with information identifying what the specific cause, event, or occasion is within the user application 150. As part of a social network, the phone case can receive "content" (e.g., commands) that are associated with different kinds of cause-based or brand-based entities in addition to being controllable by the user. In some embodiments, the network or cloud layer 154 may have primary control while users may be provided interstitial control. Therefore, Users may forego some degree of control over the lights. By foregoing some degree of control over the lights, the lighting control system may provide various advantages as it enables multiple users to access the same lighting installation and can provide programming or content of the lights directly to the users (e.g., in response the users can determine why the light is a certain color that night).

Edge Server Components

Figure 2:
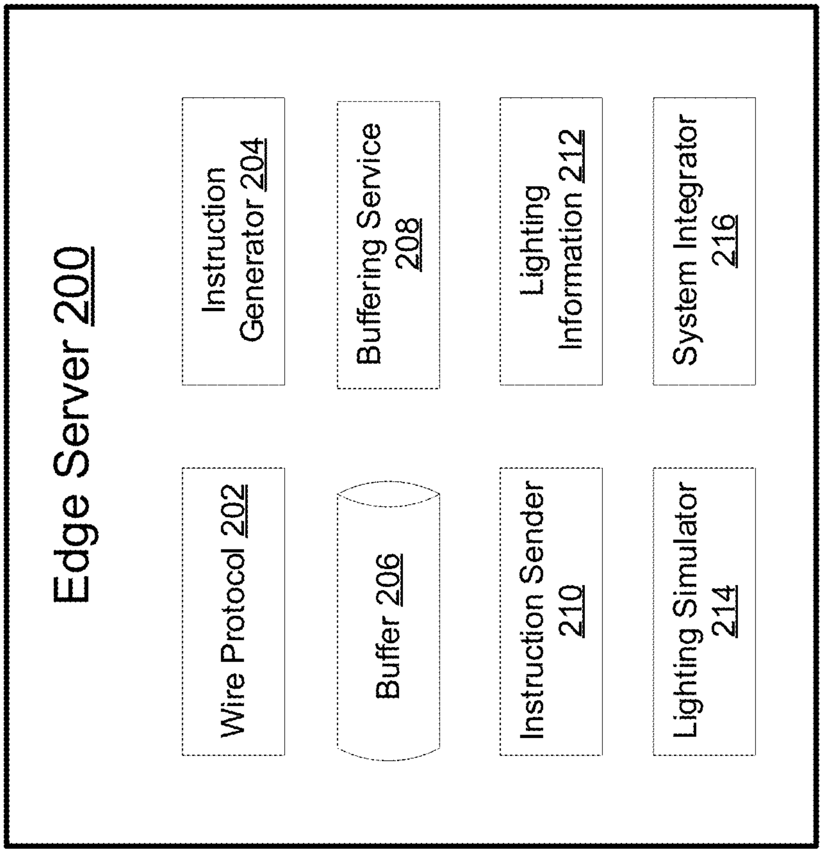
FIG. 2 illustrates components of an edge server, in accordance with embodiments of the present disclosure.

FIG. 2 illustrates components of an example edge server 200, in accordance with embodiments of the present disclosure.

As a general overview, the edge server 200 may receive messages (e.g., associated with user commands) from the cloud layer, translate those commands into set(s) of instructions that can be used to control a set of lights of a lighting installation (e.g., co-located with the edge server 200). For example, the instructions may be used to control a set of lights in real-time. The edge server 200 can send the instructions to the lighting installation to (e.g., directly) control the appearance of the lights. As shown in FIG. 2, the edge server 200 may include one or more components consisting of a wire protocol 202, an instruction generator 204, a buffer 206, a buffering service 208, an instruction sender 210, lighting information 212, a lighting simulator 214, and a system integrator 216.

In some embodiments, both the cloud layer and the edge server may adhere to a wire protocol 202. The wire protocol 202 may include a set of rules regarding how data can be sent and represented (e.g., in what order and in what format) and how lighting behavior can be specified within messages. In some embodiments, the cloud layer may send messages to the edge server 200 in a data format that is capable of describing a sequence of commands provided by a user. For example, the cloud layer may send to the edge server a message with an array that comprises a sequence of commands. For example, the cloud layer may receive a sequence of commands provided by a user (e.g., input into a user application) and convert the commands into a data object of a predetermined data format, such as Extensible Data Notation (EDN) or JavaScript Object Notation (JSON), based on the wire protocol 202. The cloud layer can send the data object in a message to the edge server 200. The edge server 200 can receive the message and reference the wire protocol 202 in order to parse the data object and obtain a command or a sequence of commands provided by the user.

In some embodiments, the messages sent by the cloud layer to the edge server 200 may contain commands for controlling the lights that are semantic in nature. Some examples of lighting behaviors conveyable in commands may include sparkle, pulse, fill, push, fade all (e.g., fade all lights in the lighting installation), fade (e.g., for a particular light), and write. Commands may also include names/values, such as to specify a particular color, light intensity, text message (e.g., for a write command), and so forth. Commands may also include one or more time components, such as a time window or duration for executing the lighting behavior and/or a time to initiate execution of the lighting behavior. For instance, a command may convey to the edge server 200 to perform a fade all (e.g., fade all the lights in the lighting installation) to a particular shade of blue over a duration of five seconds at 8 PM EST.

In some embodiments, a write command may direct the lights of the installation to communicate a user-provided text message by switching the lights on and off in a particular fashion (e.g., to signal in Morse code). In some embodiments, the lighting installation include a particular number of lights allowing the lighting installation to serve as a text display (e.g., a dot-matrix display, in which lights are arranged in a grid), and a write command may direct the lights to write out a user-provided text message (e.g., a ticker). In some embodiments, the lights may write out the user-provided text message at a particular speed such that the lights appear to be flickering to the human eye of a casual observer. Use of long exposure photography or high speed cameras may allow the text message to be read that may not be readable by the human eye. Therefore, the lighting control system can enable the sending of secret text messages.

In some embodiments, the edge server 200 may have an instruction generator 204 for generating one or more sets of instructions for controlling the lights based on the command(s) in a message received from the cloud layer. In some embodiments, the instruction generator 204 may reference the wire protocol 202 in order to parse or interpret the commands in a received message. The instruction generator 204 may identify the lighting behaviors associated with various types of commands. Therefore, the instruction generator 204 may determine a set of instructions to generate based on a particular command. In some embodiments, the instructions generated by the instruction generator 204 of the edge server 200 may be in the form of packets, such as lighting control packets. The lighting control packets can be User Datagram Protocol (UDP) packets or packets based on any suitable communication protocol that can be used across a network for time-sensitive transmissions such as video playback or DNS lookups.

In some embodiments, the edge server 200 may stream instructions to the lighting installation in a flow (e.g., a steady and/or continuous flow). For example, the edge server 200 can send lighting control packets to the lighting installation at a repeated interval. In order to provide instructions that capture a particular lighting behavior, the instruction generator 204 may generate lighting control packets based on the repeated interval at which the lighting control packets are to be sent. For example, the instruction generator 204 of the edge server 200 may generate lighting control packets to be successively sent at particular time intervals, such as at a rate of forty times per second. The repeated interval may be variable and configurable for different edge servers based on a variety of factors, including the specifications of the lighting installation(s) co-located with each edge server. Based on the edge server 200 receiving a message from the cloud layer, the instruction generator 204 may determine a number of instructions (e.g., lighting control packets) to generate for the message based on the effective duration of the lighting behavior message (e.g., how long that particular message should affect the lights) and the rate at which instructions are to be sent. The edge server may also compute the values for the lighting control packets based on the particular message, the effective duration of the message (e.g., how long that particular message should affect the lights), and the rate at which lighting control packets are to be sent.

In some embodiments, the generated instructions may include discrete states or values, such as values for directly controlling the colors or the intensity of the color channels of the lights. In some embodiments, the instruction generator 204 may block compute these values in advance based on a received command before the values are used for generating a set of instructions. The instruction generator 204 may use various algorithms for computing the values depending on the particular command and the parameters of the command. In cases where the command involves gradual changes in a discrete state of the lights (e.g., fade to X color over Y period of time), the instruction generator 204 may calculate the individual states of the gradient by using a linear interpolation function, expanding to all of the discrete values, and including those values in a set of ordered lighting control packets. For instance, the instruction generator 204 may determine a current value for a color or intensity at the lighting installation and the desired end value provided in the command. The instruction generator 204 may use those two values as endpoints to interpolate a set of estimated values between the two values. The estimated values can then be used in separate instructions that are sent in successive order (e.g., at the repeated interval) in order to effect a smooth transition between the current value and the desired value.

In some embodiments, the edge server 200 may include a buffer 206 that is maintained by a buffering service 208. The buffer 206 may form a queue that specifies the order and timing under which generated instructions (e.g., lighting control packets) are to be sent to the lighting installation. For instance, the instruction generator 204 may generate a set of lighting control packets, and the buffering service 208 may add that set of lighting control packets (or pointer(s) to the packets) in a specific order to the buffer 206, which can dictate the order in which the lighting control packets are sent to the lighting installation and executed. For example, the buffer 206 may include one or more locations and each location may correspond to a particular time of implementation for corresponding lighting instructions. Therefore, the buffering service 208 may add instructions in particular locations of the buffer 206 based on an implementation time for the instructions (e.g., as provided in the command). In some embodiments, the edge server 200 may have more than one buffer 206, such as a separate buffer 206 for each co-located lighting installation associated with the edge server 200.

In some cases, a user command provided by the user application and/or cloud layer may be sent to the edge server 200 to be executed just-in-time (e.g., immediately), and the set of instructions generated for the command may be added to the front of the buffer 206 to be sent to the lighting installation (e.g., immediately). If there is a previous set of instructions at the front of the buffer 206 (e.g., a previous command has not finished executing), the buffering service 208 may delete the previous set and/or overwrite the previous set with the new instructions. The instruction generator 204 may generate new instructions and intercept the previous instructions (e.g., immediately) to provide a seamless transition. For example, if the edge server 200 is in the process of sending out a previous set of instructions for a fade to red and receives a command to fade to blue, the edge server 200 may determine the current color displayed by the lighting installation and generate a new set of instructions to transition from the current color to blue. The unsent instructions from the previous set can be discarded and the color of the lights can proceed according to the new set of instructions In some cases, the command sent to the edge server 200 may be associated with a time for future execution. The buffering service 208 may add the set of instructions generated for the command to a location in the buffer 206. The lighting control packets of the set of instructions can await in the buffer to be sent to the lighting installation at a particular time specified by the command. Any existing instructions at the same location in the buffer 206 may be deleted and/or overwritten by the buffering service 208. This allows lighting control packets to be generated well in advance of execution.

As an example, the edge server 200 can receive a message from the cloud layer with the command to fade (e.g., dim) the lights over a period of five seconds and the edge server 200 can send lighting control packets to the lighting installation at a rate of forty times per second. Thus, in order to provide instructions for this particular lighting behavior, the instruction generator 204 can generate an ordered set of two hundred lighting control packets corresponding to the five second period. In order to dim the lights, the instruction generator 204 may calculate (e.g., interpolate), based on the current lighting intensity value (e.g., of the lighting installation) and the desired lighting intensity value at the end of the five second period, the corresponding intensity values for each lighting control packet in the ordered set, such that each successive lighting control packet can have a lower intensity value than the previous lighting control packet until the desired lighting intensity value is reached. This resulting ordered set of lighting control packets, generated based on a single received message, can be added to the front of the buffer 206 to be sent to the lights in order.

In some embodiments, the edge server 200 may include lighting information 212. The lighting information 212 may include information about any co-located lighting installations and the lights at each lighting installation. Examples of available information may include the current states or values associated with the lights, unique reference identifiers (e.g., a fixture ID) or network information for the lights, the spatial locations of the lights, and so forth. For example, the edge server 200 may track the states and values in the most-recent instruction set sent to a lighting installation and store it as part of the lighting information 212. Further, the edge server 200 may send requests to lighting installations for the lighting information 212. The lighting information 212 can be referenced to determine the current states or values of each light at the lighting installation when generating instructions. In some embodiments, it may be faster and more efficient for the edge server 200 to independently keep track of the lighting information associated with the lights at the lighting installation rather than sending requests to retrieve the states from the lighting installation.

In some embodiments, the lighting information 212 may include a resource file that at least describes the spatial location, the unique reference identifier (e.g., fixture ID), and/or the network information of each light in a lighting installation. In some embodiments, setup of the edge server 200 may involve a system integrator 216 (e.g., a setup wizard) that streamlines and simplifies the installation process to make it easy to import or define the resource file as compared to the installation process for other lighting installations. This resource file may be imported to the edge server 200 to quickly provide the edge server 200 with knowledge of the lights in the lighting installation, allowing the edge server 200 to be (e.g., quickly and easily) installed and setup.

In some embodiments, a lighting simulator 214 of the edge server 200 may use the contents of the resource file (e.g., the spatial locations of the lights) in order to create a simulation of a virtual environment with a 3D representation of all or a portion of the lights in the lighting installation that may be used for diagnostic/monitoring and/or testing/staging purposes. The representations of the lights in the simulation may have fidelity (e.g., close fidelity) with the actual states of the lights at the lighting installation. The edge sever 200 may cause the simulation to be presented to a user (e.g., through a user interface provided by the lighting simulator 214 or within a web browser) to allow the user to monitor the states of the lights at the lighting installation for troubleshooting purposes. The edge sever 200 may enable the development and scripting of complex lighting behaviors (e.g., an array of commands that can be sent to the edge server 200 in a message) to allow users to issue commands on more than just an ad hoc basis.

In some embodiments, the cloud layer may have a copy of the resource file or retrieve the resource file from the edge server 200. The resource file can enable the cloud layer to create a simulation of a virtual environment with a three-dimensional representation of all or a portion of the lights in the lighting installation. The cloud layer may provide the simulation to a user to allow the user to monitor the states of the lights at the lighting installation for troubleshooting or staging purposes. For instance, the user may view the simulation and preview the states of the lights through a user interface of the user application operating on the user device. The visualization may enable the building and saving of scripts for complex lighting behaviors (e.g., a set of commands) for deployment.

Figure 3:
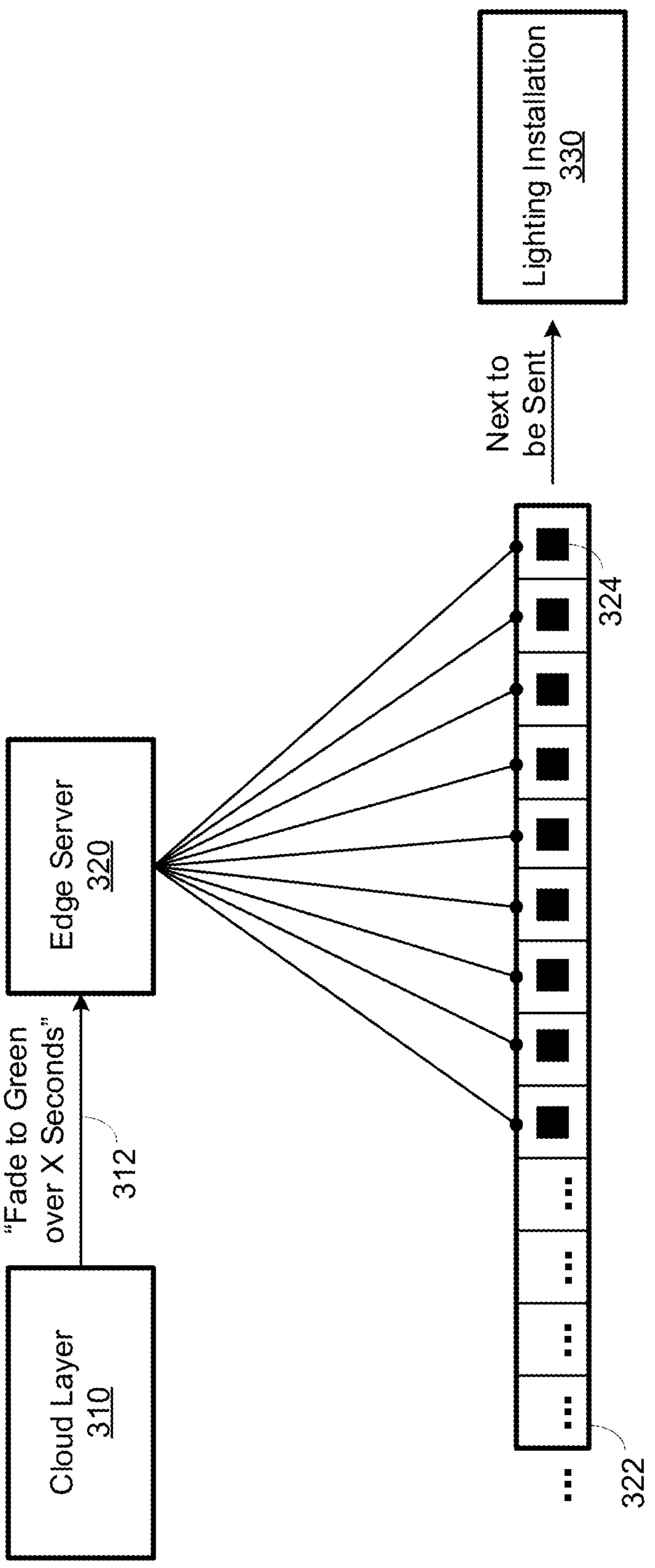
FIG. 3 illustrates an example use of a buffer of the edge server, in accordance with embodiments of the present disclosure.

FIG. 3 illustrates an example functionality of an edge server 320, which is co-located with a lighting installation 330.

In the example of FIG. 3, the lights of the lighting installation 330 may be set to a shade of blue and the edge server 320 may send instructions (e.g., lighting control packets) to the lighting installation 330 at a rate of forty times per second. The edge server 320 may continuously stream instructions to the lighting installation 330, such that if there is an interruption at the lighting installation 330 (e.g., the power goes out and it has to restart) the lighting installation 330 can continue executing instructions immediately once restored.

As depicted, the cloud layer 310 can send a message to the edge server 320 with a command to fade to green over a period of five seconds. In order to progressively transition the lights to the desired shade of green over the five second period, the edge server 320 may calculate (e.g., interpolate)—based on the current shade of blue at the lighting installation 330 and the desired shade of green at the end of the five second period—the corresponding lighting color values for each lighting control packet in an ordered set such that the lighting color value for each successive lighting control packet is more 'green' than the previous one.

In the example of FIG. 3, the edge server 320 can calculate the lighting color values for the ordered set of two hundred lighting control packets corresponding to the message duration (e.g. forty packets per second over a duration of five seconds). Based on these lighting color values, the edge server 320 may generate the set of two hundred lighting control packets and add them to the front of the buffer 322 to be sent to the lighting installation 330 in order. More specifically, the first-in-line packet 324 in the buffer 322 can be sent to the lighting installation 330 at the configured rate (e.g., every 1/40th of a second in this example). In some embodiments, the edge server 320 may have a separate buffer for each co-located lighting installation associated with the edge server 320. For example, the buffer 322 may specifically correspond to the lighting installation 330 and organize the lighting control packets that are sent to the lighting installation 330.

It will be understood that there may not be limit to the effective duration or time period that can be associated with a command. For instance, if the cloud layer 310 sends a message to the edge server 320 to perform the fade over a long period of time (e.g., an hour), the edge server 320 may compute the discrete values for the large number of lighting control packets that would be sent over the effective duration. In some embodiments, the edge server 320 may perform block computations of states or values for separate chunks of time. For instance, instead of calculating the color values for the entire hour that the fade is performed, the edge server 320 may perform the calculations for the lighting control packets that are to be sent in the first thirty seconds, then perform the calculations for the lighting control packets that are to be sent in the next thirty seconds, and so forth.

If the edge server 320 receives another message while the lighting control packets in the buffer 322 are being sent, such as a message with the command to fade to red over a period of five seconds, then the message may be interpreted by the edge server 320 to generate new instructions. For instance, the edge server 320 may determine the current color value of the lights (e.g., by referencing the color value in the last lighting control packet that was sent to the lighting installation 330) and the color value for the desired shade of red at the end of the five second period in order to calculate all or a portion of the corresponding color values for the two hundred lighting control packets for the fade to red. The lighting control packets for the fade to red can be added to the front of its buffer 322, overwriting the remaining unsent lighting control packets for the previous fade to green command. In this manner, the edge server 320 is capable of switching (e.g., quickly) to a new message.

Figure 5:
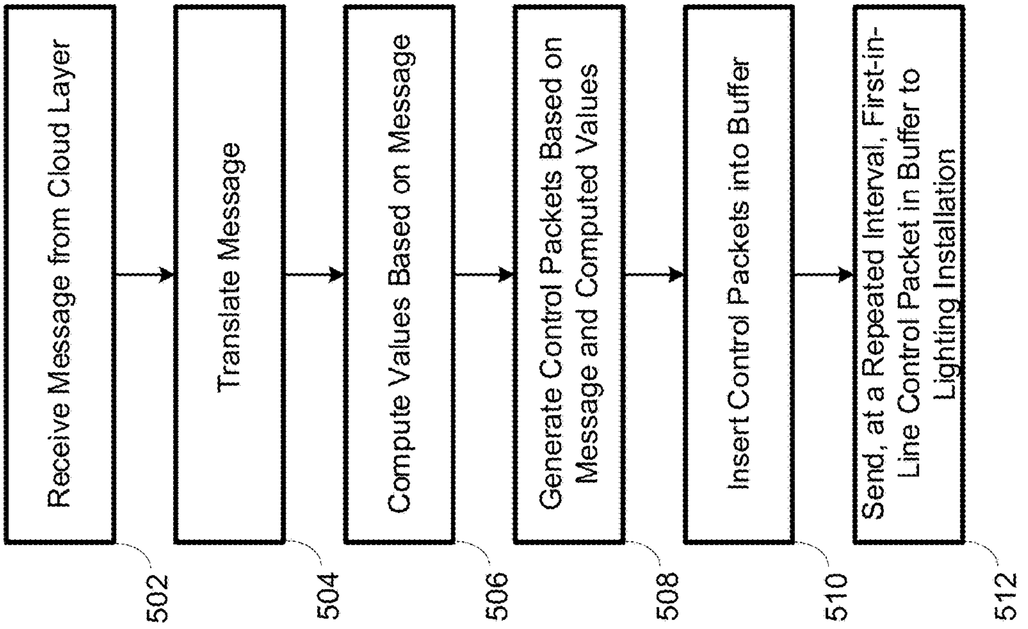
FIG. 5 is a flow diagram illustrating a basic workflow of an edge server, in accordance with embodiments of the present disclosure.

Turning now to FIG. 5, a flow chart is provided that depicts the basic workflow of an edge server.

At block 502, the edge server may receive a message from the cloud layer that can contain one or more user-provided commands for controlling the lighting behavior of the lights at a co-located lighting installation. The message may contain one or more commands that are semantic in nature and specify a particular lighting behavior to perform. The message may contain values and parameters associated with the lighting behaviors, including a duration for performing the lighting behavior or a time at which the lighting behavior is to be performed.

At block 504, the edge server may translate (e.g., interpret) the message and the one or more commands contained in the message in order to understand the nature of the lighting behavior instructed by the message. In some embodiments, the message may be structured based on a wire protocol that the edge server and the cloud layer both adhere to. The edge server may reference the wire protocol in order to interpret the message and the command(s).

At block 506, the edge server may calculate any discrete states or values, such as values for directly controlling the colors or the intensity of the color channels of the lights to perform the lighting behavior(s) indicated by the received message. The edge server may consider the commands (e.g., the lighting behavior(s) and effective duration) and the rate at which lighting control packets are sent to perform the calculations. For instance, the edge server may determine a current value and a desired end value and use the values as endpoints in a linear interpolation function to generate a set of values in between the endpoints that will provide a smooth linear transition.

At block 508, the edge server may generate lighting control packets based on the lighting behavior(s) indicated by the received message and the computed values. In some embodiments, the edge server may compute all or a portion of the values before any lighting control packets are generated (e.g., block 506 may be performed prior to block 508). In some embodiments, the edge server may perform block computation of discrete states or values by breaking up the calculation of any discrete states or values into multiple steps (e.g., calculating "chunks" of discrete states or values), and the edge server may continuously calculate the chunks of discrete states or value while generating lighting control packets in parallel using each chunk as it finishes computing (e.g., blocks 506 and 508 may be performed in tandem).

At block 510, the edge server may insert the lighting control packets into the buffer. The lighting control packets may be sent, from the buffer, to the lighting installation at the appropriate time based on the received message. A set of lighting control packets may be inserted into the buffer in a specific order based on the order that the lighting control packets are to be sent. For example, if the message is for a transitional lighting effect to be executed immediately, then the edge server may generate a set of lighting control packets for the lighting effect and insert the lighting control packets at the front of the buffer in the order that the lighting control packets are to be sent. Thus, the buffer can organize the generated lighting control packets in order. This buffer allows lighting control packets to be generated and added to the buffer in advance of having to be sent to the lighting installation, which can be used to schedule execution of lighting behavior at specific times or to synchronize the execution of lighting behaviors across different lighting installations. Accordingly, although block 512 can be performed on a periodic and continuous basis, the lighting control packets generated and inserted into the buffer at blocks 508 and 510 may not be sent to the lighting installation via block 512 immediately and may be sent to the lighting installation a period of time (e.g., minutes, hours, days, etc.) after insertion of a lighting control packet into the buffer.

At block 512, the edge server may send, at a repeated interval, the first-in-line lighting control packet of the buffer to the lighting installation in order to continuously stream instructions to the lighting installation. In some embodiments, if the edge server does not identify any unimplemented user-issued commands to execute, the edge server may continuously send lighting control packets to the lighting installation. For instance, the edge server may (e.g., repeatedly) duplicate and send the last-sent lighting control packet. Therefore, the buffer may not be emptied by the edge server. This may done for redundancy purposes, so that if the lighting installation encounters an error and restarts, the lighting installation can receive lighting control packets once it restarts and can resume operation.

NTP Synchronization

There may be numerous benefits associated with the system and control architecture described herein, in which a cloud layer (e.g., a control server) sends a message to an edge server which generates the actual lighting control packets used to control the lights. In particular, there may be timing issues with having the cloud layer send lighting control packets directly to the lights over a wide area network (WAN), such as the Internet. In such cases, there may be jitter and network traffic between the cloud layer and the lights, which can prevent lighting control packets from arriving at equal intervals. The system and control architecture described herein does not have this problem, since the discrete states for the lights, which are time-critical, are not sent over the WAN. Instead, the cloud layer sends to the edge server over the WAN a message (e.g., the smallest possible message) instructing the edge server to locally generate the discrete states for the lights over a period of time. The system and control architecture can remove all or a portion of the variability introduced from the transmission of commands and lighting control packets over a network.

Figure 4:
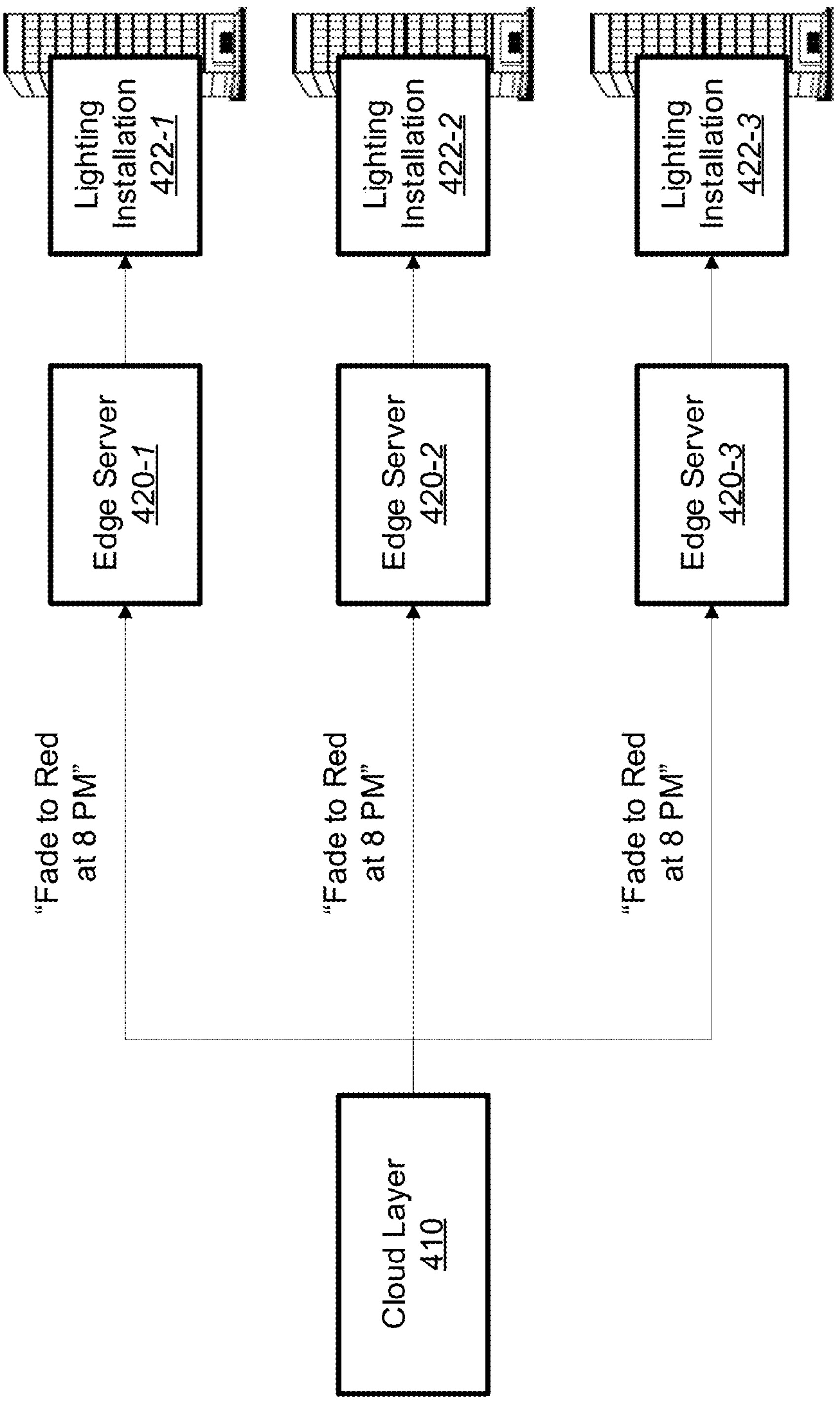
FIG. 4 is a block diagram illustrating synchronized execution with multiple edge servers, in accordance with embodiments of the present disclosure.

This feature is demonstrated in FIG. 4, which illustrates an example of how timing issues can be resolved by the control architecture contemplated herein. However, it should be noted that this control architecture can be adapted for use with any suitable time-critical data stream and is not restricted for use with only lighting control packets.

In FIG. 4, a cloud layer 410 is communicatively coupled to an edge server 420-1, an edge server 420-2, and an edge server 420-3. Edge server 420-1 is co-located with lighting installation 422-1, edge server 420-2 is co-located with lighting installation 422-2, and edge server 420-3 is co-located with lighting installation 422-3. In the illustrated embodiment, the cloud layer 410 may specify a time of execution for a command in a message sent to an edge server. In other words, the cloud layer 410 may send a message to an edge server to perform a lighting behavior at a future time (e.g., fade to red at 8 PM tonight) and the recipient edge server can generate instructions (e.g., lighting control packets) in advance that will be sent to its associated lighting installation at the instructed time. It will be understood that the cloud layer 410 may be communicatively coupled to more, less, or different edge servers and each edge server may be co-located with more, less, or different lighting installations.

In some embodiments, the cloud layer 410 may send messages specifying times of execution to multiple edge servers, which can synchronize the execution of commands by those edge servers. For example, as shown in FIG. 4, the cloud layer 410 may send a message directing execution of a command at a specific time (e.g., fade to red at 8 PM tonight) to each of the edge servers 420-1, 420-2, and 420-3. Upon receiving this message, each recipient edge server 420-1, 420-2, and 420-3 may generate the lighting control packets associated with the command and add the packets to their respective buffer to be sent to their corresponding lighting installations 422-1, 422-2, and 422-3 starting at 8 PM. The end result can be that the lighting installations 422-1, 422-2, and 422-3 can each fade to red simultaneously at 8 PM.

Thus, based on a Network Time Protocol (NTP) synchronization across the edge servers 420, the control architecture disclosed herein can enable control of the lights across the edge servers to be synchronized while removing all or a portion the variability introduced by the network. This is an improvement over having the cloud layer 410 send instructions directly to the lighting installations as the instructions sent to different lighting installations may arrive at different times due to network delays which can result in execution at different times.

Example Hardware Configuration of Computing System

Figure 6:
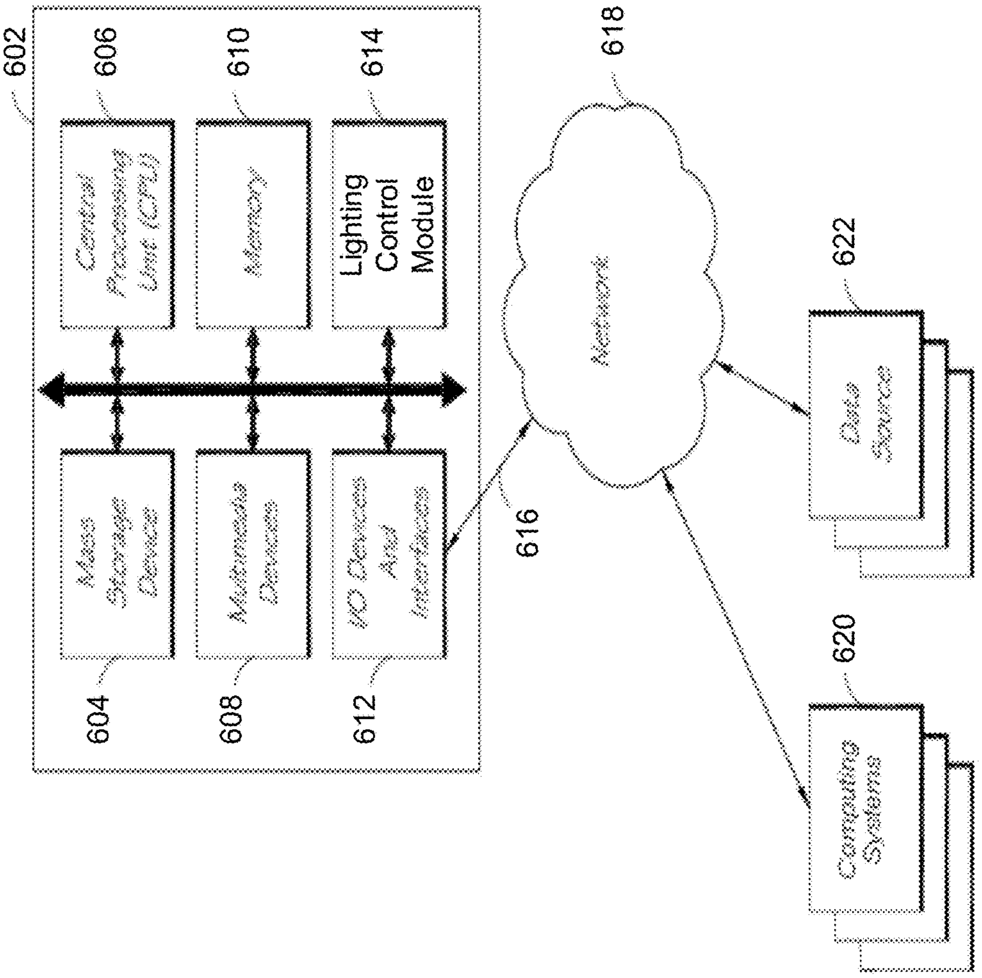
FIG. 6 illustrates an embodiment of a hardware configuration for a computing system usable with embodiments of the present disclosure.

FIG. 6 illustrates an embodiment of a hardware configuration for a computing system that can be used to implement the systems, processes, and methods described herein. For example, the illustrated embodiment of the computer system can be used for an edge server in the system architecture described herein.

For instance, the example computer system 602 is in communication with one or more computing systems 620 and/or one or more data sources 622 via one or more networks 618. While FIG. 6 illustrates an embodiment of a computing system 602, it is recognized that the functionality provided for in the components and modules of computer system 602 may be combined into fewer components and modules, or further separated into additional components and modules.

The computer system 602 can comprise a Lighting Control module 614 that carries out the functions, methods, acts, and/or processes described herein. The Lighting Control module 614 is executed on the computer system 602 by a central processing unit 606 discussed further below.

In general the word "module," as used herein, refers to logic embodied in hardware or firmware or to a collection of software instructions, having entry and exit points. Modules are written in a program language, such as JAVA, C or C++, PYTHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 602 includes one or more processing units (CPU) 606, which may comprise a microprocessor. The computer system 602 further includes a physical memory 610, such as random access memory (RAM) for temporary storage of information, a read only memory (ROM) for permanent storage of information, and a mass storage device 604, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 602 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 602 includes one or more input/output (I/O) devices and interfaces 612, such as a keyboard, mouse, touch pad, and printer. The I/O devices and interfaces 612 can include one or more display devices, such as a monitor, that allows the visual presentation of data to a participant. More particularly, a display device provides for the presentation of GUIs as application software data, and multi-media presentations, for example. The I/O devices and interfaces 612 can also provide a communications interface to various external devices. The computer system 602 may comprise one or more multi-media devices 608, such as speakers, video cards, graphics accelerators, and microphones, for example.

The computer system 602 may run on a variety of computing devices, such as a server, a Windows server, a Structure Query Language server, a Unix Server, a personal computer, a laptop computer, and so forth. In other embodiments, the computer system 602 may run on a cluster computer system, a mainframe computer system and/or other computing system suitable for controlling and/or communicating with large databases, performing high volume transaction processing, and generating reports from large databases. The computing system 602 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 602 illustrated in FIG. 6 is coupled to a network 618, such as a LAN, WAN, or the Internet via a communication link 616 (wired, wireless, or a combination thereof). Network 618 communicates with various computing devices and/or other electronic devices. Network 618 is communicating with one or more computing systems 620 and one or more data sources 622. The Lighting Control module 614 may access or may be accessed by computing systems 620 and/or data sources 622 through a web-enabled user access point. Connections may be a direct physical connection, a virtual connection, and other connection type. The web-enabled user access point may comprise a browser module that uses text, graphics, audio, video, and other media to present data and to allow interaction with data via the network 618.

Access to the Lighting Control module 614 of the computer system 602 by computing systems 620 and/or by data sources 622 may be through a web-enabled user access point such as the computing systems 620 or data source's 622 personal computer, cellular phone, smartphone, laptop, tablet computer, e-reader device, audio player, or other device capable of connecting to the network 618. Such a device may have a browser module that is implemented as a module that uses text, graphics, audio, video, and other media to present data and to allow interaction with data via the network 618.

The output module may be implemented as a combination of an all-points addressable display such as a cathode ray tube (CRT), a liquid crystal display (LCD), a plasma display, or other types and/or combinations of displays. The output module may be implemented to communicate with input devices 612 and they also include software with the appropriate interfaces which allow a user to access data through the use of stylized screen elements, such as menus, windows, dialogue boxes, toolbars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the computing system 602 may comprise a physical or logical connection established between a remote microprocessor and a mainframe host computer for the express purpose of uploading, downloading, or viewing interactive data and databases on-line in real time. The remote microprocessor may be operated by an entity operating the computer system 602, including the client server systems or the main server system, and/or may be operated by one or more of the data sources 622 and/or one or more of the computing systems 620. In some embodiments, terminal emulation software may be used on the microprocessor for participating in the micro-mainframe link.

In some embodiments, computing systems 620 which are internal to an entity operating the computer system 602 may access the Lighting Control module 1114 internally as an application or process run by the CPU 606.

The computing system 602 may include one or more internal and/or external data sources (for example, data sources 622). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 602 may also access one or more databases 622. The databases 622 may be stored in a database or data repository. The computer system 602 may access the one or more databases 622 through a network 618 or may directly access the database or data repository through I/O devices and interfaces 612. The data repository storing the one or more databases 622 may reside within the computer system 602.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method performed by an edge server co-located with a lighting installation, the method comprising:

- receiving a command identifying a lighting behavior;
- determining the lighting behavior from the command;
- computing a plurality of lighting values based on the lighting behavior;
- generating a plurality of instructions comprising the plurality of lighting values;
- inserting the plurality of instructions into a buffer; and
- sending, at a repeated interval, a first-in-line instruction in the buffer to the lighting installation.

2. The method of claim 1, wherein determining the lighting behavior from the command is based on a wire protocol adhered to by the cloud layer.

3. The method of claim 1, wherein each of the plurality of instructions comprises a lighting control packet.

4. The method of claim 1, wherein the repeated interval is a send rate of forty times per second.

5. The method of claim 1, wherein each of the plurality of instructions comprises a different lighting value of the plurality of the lighting values.

6. The method of claim 1, wherein the plurality of instructions are inserted into the buffer at a location in the buffer based on the command.

7. The method of claim 1, wherein the command further identifies an execution time for the lighting behavior.

8. The method of claim 1, wherein computing the plurality of lighting values involves computing the plurality of lighting values in blocks.

9. The method of claim 1, wherein the plurality of lighting values comprise lighting colors for the lighting installation.

10. The method of claim 1, wherein the plurality of lighting values comprise color channel intensities for the lighting installation.

11. A system comprising:

a lighting installation; and an edge server co-located with the lighting installation, wherein the edge server comprises:

a memory device that stores a set of instructions;

at least one processor capable of executing the set of instructions to:

receive a command identifying a lighting behavior;

determine the lighting behavior from the command;

compute a plurality of lighting values based on the lighting behavior;

generate a plurality of instructions comprising the plurality of lighting values;

insert the plurality of instructions into a buffer; and send, at a repeated interval, a first-in-line instruction in the buffer to the lighting installation.

12. The system of claim 11, wherein determining the lighting behavior from the command is based on a wire protocol adhered to by the cloud layer.

13. The system of claim 11, wherein each of the plurality of instructions comprises a lighting control packet.

14. The system of claim 11, wherein each of the plurality of instructions comprises a different lighting value of the plurality of the lighting values.

15. The system of claim 11, wherein the plurality of instructions are inserted into the buffer at a location in the buffer based on the command.

16. The system of claim 11, wherein the command is further descriptive of an execution time for the lighting behavior.

17. The system of claim 11, wherein computing the plurality of lighting values involves computing the plurality of lighting values in blocks.

18. A non-transitory computer readable medium that stores a set of instructions that are executable by at least one processor of an electronic device to cause the electronic device to provide instructions to a co-located lighting installation by:

receiving a command identifying a lighting behavior;

determining the lighting behavior from the command;

computing a plurality of lighting values based on the lighting behavior;

generating a plurality of instructions comprising the plurality of lighting values;

inserting the plurality of instructions into a buffer; and sending, at a repeated interval, a first-in-line instruction in the buffer to the lighting installation.

19. The non-transitory computer readable medium of claim 18, wherein determining the lighting behavior from the command is based on a wire protocol adhered to by the cloud layer.

20. The non-transitory computer readable medium of claim 18, wherein each of the plurality of instructions comprises a lighting control packet.

* * * * *